O. Taff.
Floor Clamp.
Nº 104,790. Patented Jun. 28, 1870.

Witnesses:
J. W. Coombs
Fred. Haynes

Inventor:
Oliver Taff

United States Patent Office.

OLIVER TAFF, OF WHITESTONE, NEW YORK.

Letters Patent No. 104,790, dated June 28, 1870; antedated June 16, 1870.

IMPROVEMENT IN FLOOR-CLAMP.

The Schedule referred to in these Letters Patent and making part of the same.

*To all whom it may concern:*

Be it known that I, OLIVER TAFF, of Whitestone, in the county of Queens and State of New York, have invented a new and Improved Floor-Clamp; and I do hereby declare that the following is a full, clear, and exact description of the same, reference being had to the accompanying drawing which forms part of this specification.

The object of this invention is the more convenient clamping together of the planks of floors while being laid preparatory to the nailing down of the same; and The invention consists in a floor clamp of novel character, composed of a dog having a biting and a sliding tooth or stud for engaging with opposite sides of the joist, and having pivoted thereto an adjustable bearing-plate and wedge, whereby, when the dog is adjusted to the joist and the wedge forced between the bearing-plate and the edge of the plank, the backward force of the wedge exerted against the said bearing-plate, and thereby against the dog, causes, by the penetration of the biting tooth and the slipping of the sliding tooth or stud, the tighter griping of the dog upon the joist and the greater capacity of the same for resisting the action of the wedge.

Referring to the accompanying drawing—

Figure 1:
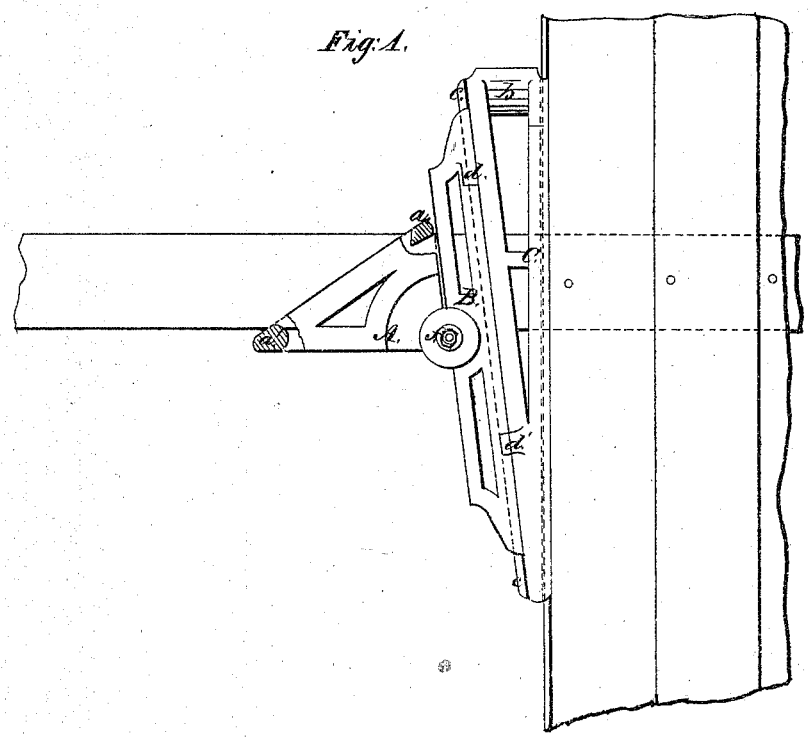
Figure 2:
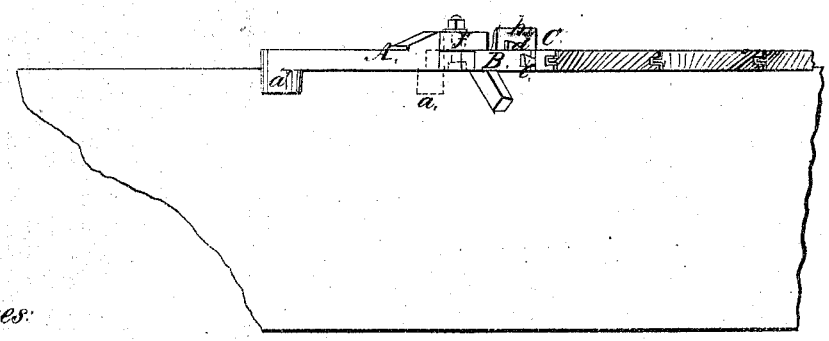

Figure 1 represents a plan view of a floor-clamp, constructed according to my invention, applied to a joist ready for operation, and having the corners of the dog broken away for illustrating the form of its teeth or studs and their action upon the joist; and Figure 2 represents a vertical end view of the same.

Similar letters of reference indicate corresponding parts in both figures.

A is a dog of triangular form, having a biting tooth, $a$, and a sliding tooth, $a'$. Said teeth $a\ a'$ are arranged upon the two outer corners of the dog, and are made to project downward, so as to engage with the joist upon opposite sides, and are of the respective forms, as shown, or of such other forms as may render them best suited for the performance of their respective functions.

B is a bearing-plate or wedge-carrier, of a form substantially as that shown in the drawing. It is secured by one edge at or near its middle to the inner corner of the dog, by means of a pivot, $f$. It also has formed in its outer or opposite edge a dovetailed groove into which is fitted to slide a correspondingly formed tongue, $c$, of a wedge, C, so that the free sliding back or forth of the wedge may be allowed without much liability of being lost therefrom.

The wedge C, being of the ordinary wedge-shape, has a groove in its outer edge for reception of the tongue of the plank. It has also a projection, $b$, near its butt end, and against which the blows of the hammer, or other driving implement, are applied for forcing back or loosening the said wedge.

$d\ d'$ are interfering lugs provided respectively upon the bearing-plate or wedge-carrier and wedge for preventing inconvenience and loss of time by the accidental forcing of the latter entirely out of the former while being loosened or driven back.

This apparatus is constructed preferably of malleable iron, or other metal combining efficiency with cheapness.

What I claim as my invention, and desire to have secured by Letters Patent, is—

A floor-clamp, consisting of the dog A, and bearing-plate, B, pivoted together, in combination with the wedge C, substantially as herein shown and described.

OLIVER TAFF.

Witnesses:
   FRANCIS J. BARNETT,
   HENRY PALMER.